United States Patent
Blaszczak et al.

(10) Patent No.: US 9,362,765 B1
(45) Date of Patent: Jun. 7, 2016

(54) SYSTEMS AND METHODS FOR A POWER ADAPTER FOR MOBILE DEVICES

(71) Applicant: Amazon Technologies, Inc., Reno, NV (US)

(72) Inventors: Piotr Pawel Blaszczak, Sunnyvale, CA (US); Wei Wang, San Jose, CA (US); Nicholas Robert Matteson, San Francisco, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 203 days.

(21) Appl. No.: 14/075,503

(22) Filed: Nov. 8, 2013

(51) Int. Cl.
*H02J 7/00* (2006.01)
*H02J 7/02* (2016.01)
*H02J 7/35* (2006.01)

(52) U.S. Cl.
CPC ............... *H02J 7/0042* (2013.01); *H02J 7/022* (2013.01); *H02J 7/0044* (2013.01); *H02J 7/355* (2013.01)

(58) Field of Classification Search
None
See application file for complete search history.

(56) References Cited

U.S. PATENT DOCUMENTS

| | | | | |
|---|---|---|---|---|
| 5,648,712 A * | 7/1997 | Hahn | | 320/111 |
| 5,780,993 A * | 7/1998 | Tsang | | H02J 7/0042 320/111 |
| 6,091,611 A * | 7/2000 | Lanni | | H02J 7/0008 307/151 |
| 7,193,873 B2 * | 3/2007 | Lanni | | 363/146 |
| 7,658,625 B2 * | 2/2010 | Jubelirer et al. | | 439/131 |
| 7,713,073 B2 * | 5/2010 | Lin | | 439/131 |
| 7,766,698 B1 * | 8/2010 | De Iuliis et al. | | 439/638 |
| 8,113,855 B2 * | 2/2012 | Green et al. | | 439/131 |
| 8,277,239 B1 * | 10/2012 | Chan et al. | | 439/189 |
| 8,456,131 B2 * | 6/2013 | Bukow | | 320/111 |
| 8,491,317 B2 * | 7/2013 | Vardanyan | | 439/131 |
| 8,651,879 B2 * | 2/2014 | Stiehl et al. | | 439/76.1 |
| 8,712,482 B2 * | 4/2014 | Sorias | | H02J 7/0042 320/111 |
| 9,011,165 B2 * | 4/2015 | Liu et al. | | 439/131 |
| 9,130,384 B2 * | 9/2015 | Pliner | | H02J 7/0042 |
| 2007/0126290 A1 * | 6/2007 | Jaynes et al. | | 307/150 |
| 2008/0150480 A1 * | 6/2008 | Navid | | 320/113 |
| 2008/0157712 A1 * | 7/2008 | Garcia | | H02J 7/0044 320/101 |
| 2009/0151198 A1 * | 6/2009 | Villegas | | 36/45 |
| 2011/0159930 A1 * | 6/2011 | Garrett | | H04M 1/21 455/573 |
| 2013/0187459 A1 * | 7/2013 | Green | | 307/31 |
| 2014/0152257 A1 * | 6/2014 | Miller et al. | | 320/111 |
| 2014/0308853 A1 * | 10/2014 | Colahan et al. | | 439/628 |
| 2015/0015204 A1 * | 1/2015 | Sorias | | H02J 7/0042 320/111 |

OTHER PUBLICATIONS

Safe Dock Charger for iPhone 5, USB docking station dock, as viewed on Nov. 12, 2013 at: http://enjoy-ing.cn/product/1083737954-220120978/safe_dock_charger_for_iPhone_5_usb_docking_station_dock.html, 10 pages.

* cited by examiner

*Primary Examiner* — Leigh Garbowski
(74) *Attorney, Agent, or Firm* — Sutherland Asbill & Brennan LLP

(57) ABSTRACT

A power adapter for mobile devices may include an alternating current to direct current (AC/DC) converter. The AC/DC converter may convert electric power from a power source. The power adapter may include a housing enclosing the AC/DC converter. The power adapter may include a power plug extending from the housing along a first axis. The power adapter may include a Universal Serial Bus (USB) plug extending from the housing along the first axis and on an opposite end of the housing from the power plug. The power adapter may include a device charging plug pivotally coupled to the housing.

18 Claims, 8 Drawing Sheets

SYSTEMS AND METHODS FOR A POWER ADAPTER FOR MOBILE DEVICES

BACKGROUND

The rise in the popularity and use of mobile devices, such as tablets and smartphones, has led to significant improvements in the size and cost of these devices. In order to use the mobile devices, users must often remember to charge the mobile devices or carry a charger or power adapter with them. Often, the charger or power adapter utilizes cables and power cords, which may be bulky and cumbersome to carry around.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical items. Various embodiments may utilize elements and/or components other than those illustrated in the drawings and some elements and/or components may not be present in various embodiments. Throughout this disclosure, depending on the context, singular and plural terminology may be used interchangeably.

DETAILED DESCRIPTION

Figure 1:
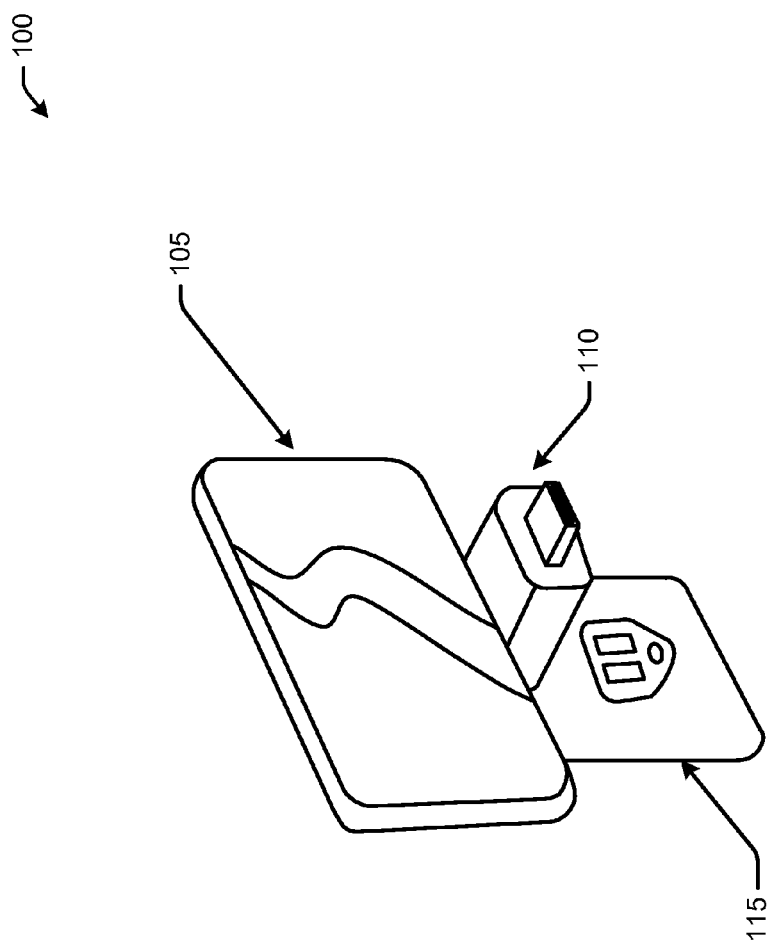
FIG. 1 schematically depicts a perspective view of an example use case of a power adapter for mobile devices, in accordance with one or more embodiments of the disclosure.

Mobile devices, such as mobile tablets and smartphones, have increased the speed and efficiency with which information is communicated and disseminated. However, such speed and efficiency can require consumption of power to process the various tasks on mobile devices. A power adapter for mobile devices is disclosed herein that provides a portable and easy-to-carry device for charging mobile devices. The power adapter disclosed herein also provides numerous other aspects relating to being able to charge mobile devices using various plugs coupled with the power adapter.

As mobile devices have become more sophisticated, users may rely on the use of the mobile device for many different tasks, such as email communications, ecommerce transactions, GPS directions, and the like. Such heavy usage generally requires the user to constantly charge his or her mobile device. However, many chargers may include a cable or cord that makes carrying the charger in a pocket undesirable due to the bulk. The power adapter disclosed herein is a small profile adapter with multiple plug options for efficient charging. The small profile power adapter may allow a user to comfortably carry a versatile adapter that is not too bulky or cumbersome to fit in a pocket or purse. For example, the power adapter may be narrower and/or shorter than a man's wallet.

A power adapter for mobile devices is disclosed that may include an alternating current to direct current (AC/DC) converter. The AC/DC converter may convert electric power from a power source, such as an alternating current (AC) wall socket or a universal serial bus (USB) port. The power adapter may include a housing that enclosed internal components of the power adapter, such as the AC/DC converter. The power adapter may be coupled to a power plug, a USB plug, and a device charging plug. The power plug may be positioned on the surface of the housing of the power adapter, extending from the housing along a first axis. The USB plug may be positioned on an opposite end of the housing from the power plug and extend out from the housing along the first axis. The device charging plug may be pivotally coupled to the housing. The device charging plug may be moveable between an extended position along a second axis perpendicular to the first axis and a recessed position along the first axis within a channel of the housing. In some embodiments, the device charging plug may also be rotationally coupled to the housing of the power adapter, where the device charging plug may rotate around the second axis when in the extended position. In some embodiments, the device charging plug may be pivotally coupled to the housing by a flexible mechanism, such as an elastic or flexible material or a hinge. The flexible mechanism may allow the device charging plug to be flexed along in the direction of the first axis. For example, if a mobile device is plugged into the device charging plug, the weight of the mobile device may cause the device charging plug to flex or slant in a forward or backward position, which may be possible due to the connection of the device charging plug to the housing by a flexible mechanism.

In some embodiments, the power plug or the USB play may be retractable into the housing or may be pivotally and/or rotationally coupled to the housing of the power adapter. In some embodiments, the USB plug may be a dedicated charging port without data support. The shape of the housing of the power adapter may support the weight of a mobile device plugged into the adapter for charging. In some embodiments, the power plug, USB plug, or the device charging plug may be interchangeable with other types of plugs. For instance, the power adapter may include AC outlet prongs that are compatible with AC sockets in the United States. If the user desires to travel to another country, such as China, the user may be able to remove the U.S. compatible AC prongs and replace them with a power plug and/or a plug with outlet prongs compatible with Chinese power sockets.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Embodiments

FIG. 1 schematically depicts a perspective view 100 of an example use case of a power adapter 110 for mobile devices 105, in accordance with one or more embodiments of the disclosure. As depicted, the power plug extending from the power adapter 110 may be inserted into a wall socket 115. The power adapter 110 is plugged into the mobile device 105. The power adapter 110 may receive power from the wall socket 115 and transmit an appropriate voltage-current of the power to the mobile device 105 to charge the mobile device 105. Examples of mobile devices may include, but are not limited to, computer peripherals (e.g., keyboard, pointing devices, portable media players, disk drivers, network adapters), digital cameras, smart phones, cell phones, wearable devices, smart watches, personal digital assistants (PDAs), tablets, video game consoles, and the like.

Figure 2:
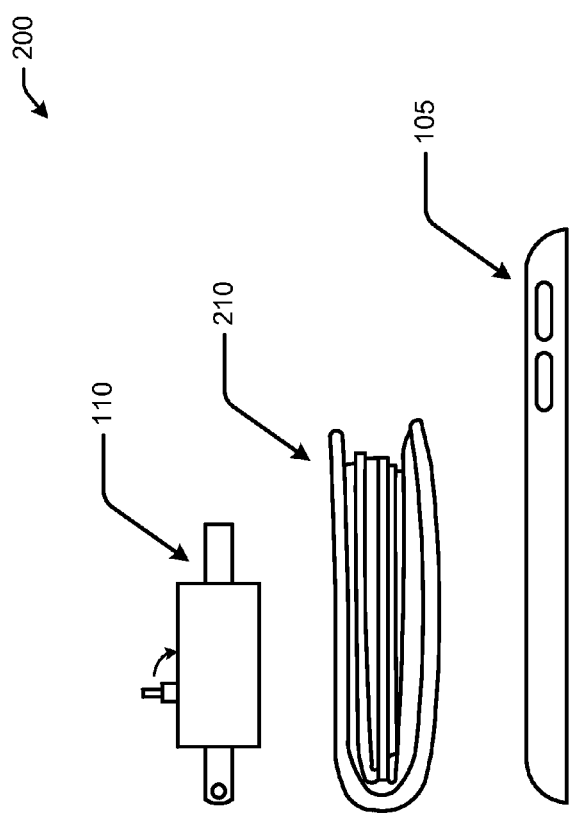
FIG. 2 schematically depicts a pictorial scale of an approximate size of a power adapter for mobile devices in accordance with one or more embodiments of the disclosure.

FIG. 2 schematically a pictorial scale 200 of an approximate size of a power adapter 110 for mobile devices 105 in accordance with one or more embodiments of the disclosure. As shown, in some embodiments, the power adapter 110 may be shorter than a man's wallet 210 as well as a mobile device 105 (e.g., smartphone). Having such a small profile may enable the user to carry the power adapter 110 in a pocket of clothing or in a small bag or purse.

Figure 3A:
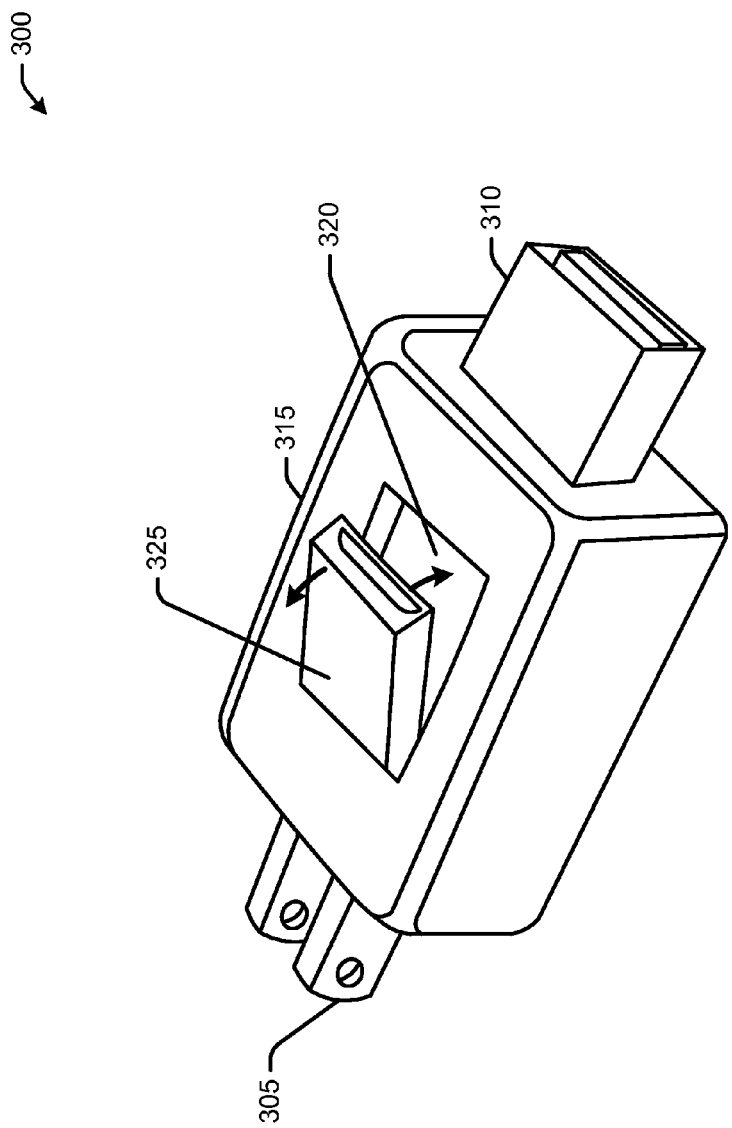
FIGS. 3A-3B schematically depict example configurations of a power adapter for mobile devices, in accordance with one or more embodiments of the disclosure.
Figure 3B:
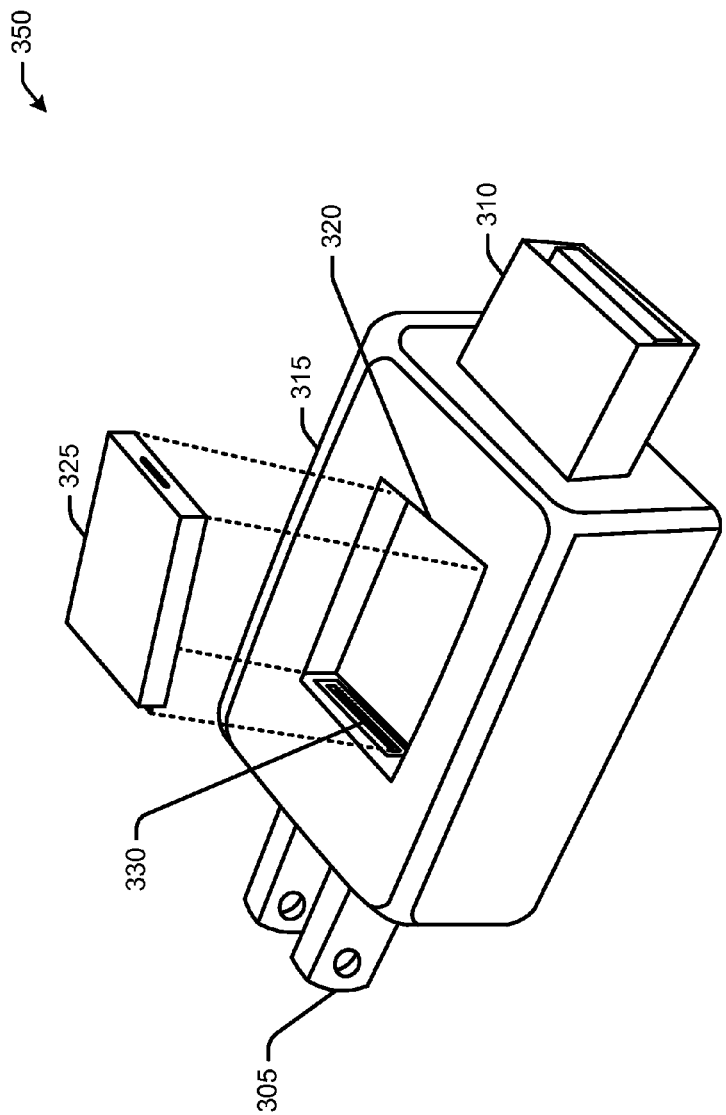
Figure 4:
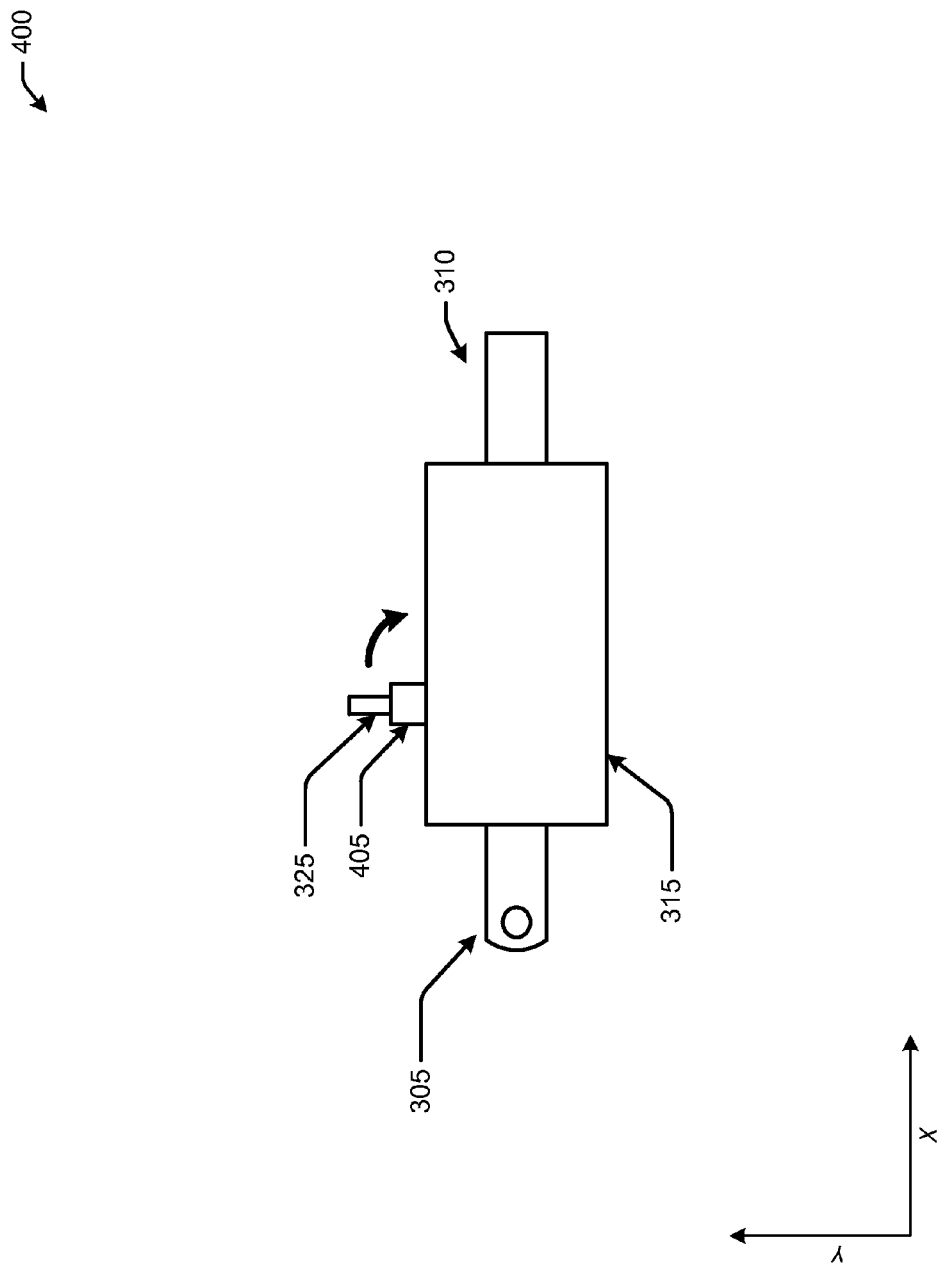
FIG. 4 schematically depicts a side view of power adapter for mobile devices in accordance with one or more embodiments of the disclosure.
Figure 5:
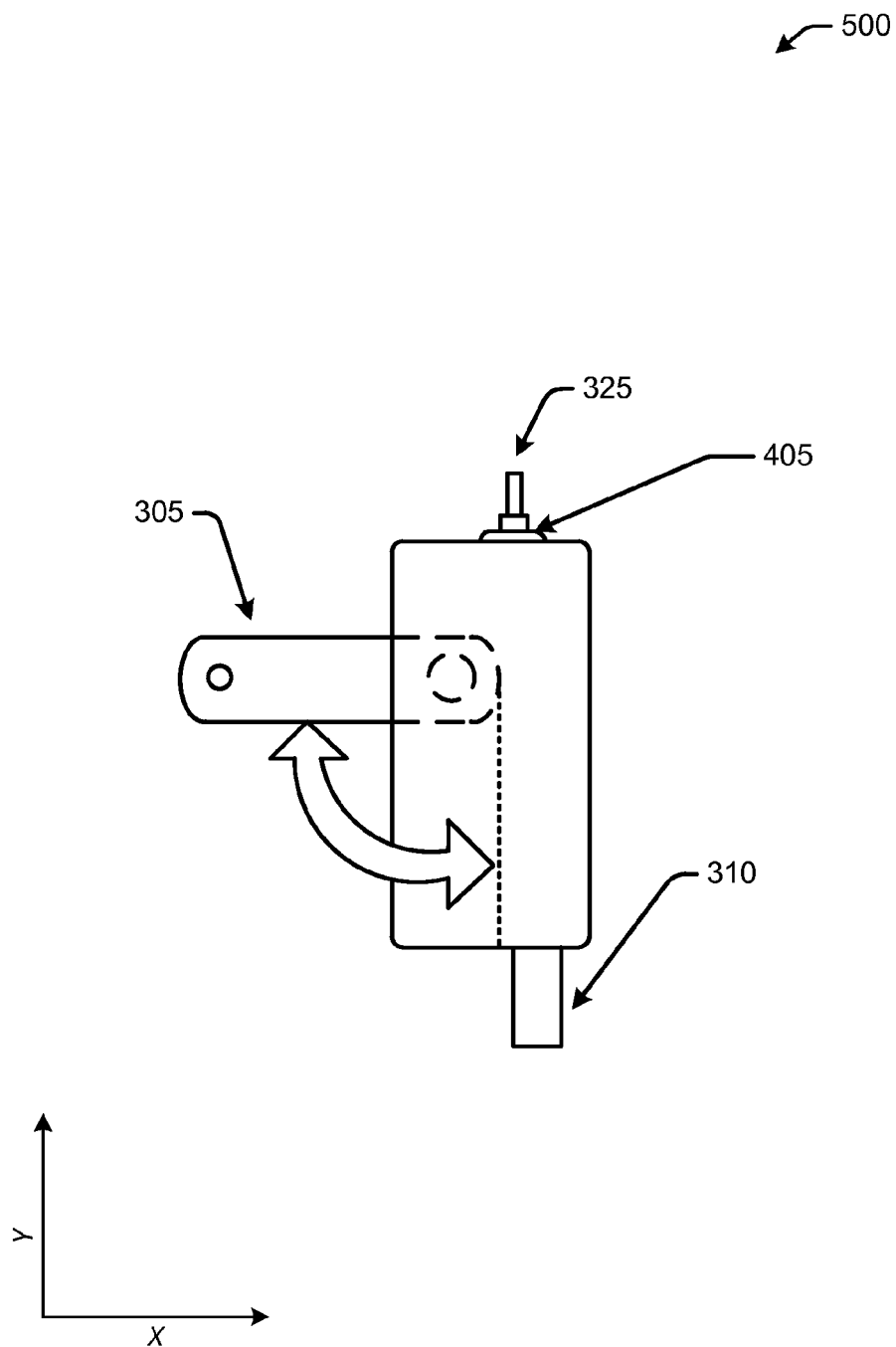
FIG. 5 schematically depicts a side view of a configuration of a power adapter for mobile devices in accordance with one or more embodiments of the disclosure.

FIGS. 3A-5 schematically depict various views of a power adapter 110 in accordance with one or more embodiments of the disclosure. Specifically, FIGS. 3A-3B schematically depict example configurations of a power adapter 110 for mobile devices 105, FIG. 4 schematically depicts a side view of power adapter 110 for mobile devices 105, and FIG. 5 schematically depicts a side view of a configuration of a power adapter 110 for mobile devices 105. Collectively referring to FIGS. 3A-5, and by way of example, the power adapter 110 may include a housing 315, a power plug 305, a USB plug 310, and a device charging plug 325.

FIGS. 3A-3B schematically depict example configurations of a power adapter 110 for mobile devices 105, in accordance with one or more embodiments of the disclosure. In FIG. 3A, a perspective view 300 of a power adapter 110 is depicted. The housing 315 may be made of or fashioned out of a protective material, such as a plastic, metal, or the like. The housing 315 may enclose internal components of the power adapter 110, such as an AC/DC converter (not pictured), which may convert electric power from a power source, such as an AC socket to direct current (DC) power. In some embodiments, the power plug 305 may extend from the surface of the housing 315 on one side of the power adapter 110 along a first axis. In some embodiments, the power plug may be fixed in its position. In some embodiments, the power plug may be pivotally or rotationally coupled to the housing 315 of the power adapter 110. In some embodiments, the power plug 305 may pivot into a recessed position. In some embodiments, the power plug 305 may be positioned within a channel within or along a side of the housing of the power adapter 110. In some embodiments, the power plug 305 may be rotatable around an axis to be better positioned to be inserted into a socket. In some embodiments, the power plug 305 may be retractable into the housing 315. In some embodiments, the power plug 305 may be connected to the housing 315 by a flexible mechanism, such as an elastic material or flexible mechanical joint, such as a hinge, that allows a certain degree of bending or movement forward or backward by the power plug 305.

In some embodiments, the power plug 305 may be interchangeable with a different power plug. For example, a U.S. compatible power plug, such as a NEMA 5-15 power plug 305 may be removed from the power adapter 110 and replaced by a power plug 305 compatible with a German socket, such as a Schuko plug. Examples of power plugs may include, but are not limited to NEMA 1-15 unpolarised plugs, NEMA 1-15 polarised plugs, NEMA 5-15 plugs, NEMA 5-20 plugs, CEE 7/16 plugs, BS 4573 plugs, BS 546 plugs, SI 32 plugs, AS/NZS 3112 plugs, CPCS-CCC plugs, and the like.

In some embodiments, a USB plug 310 may extend out from the housing 315 of the power adapter 110 along the first axis. The USB plug 310 may be a dedicated charging port without data support, wherein the USB plug 310 may only provide power and may not be able to support transmission of data between devices. In some embodiments, the USB plug 310 may support data synchronization or data exchange. In some embodiments, the USB plug 310 may be connected to a power source, such as a laptop or a USB power port to supply power to a mobile device 105 via the device charging plug 325. The USB plug 310 may be in a fixed position or may be rotatably and/or pivotably coupled to the housing 315. In some embodiments, the USB plug 310 may be retractable or slidable into the housing 315 of the power adapter 110. In some embodiments, the USB plug 310 may be connected to the housing 315 by a flexible mechanism that allows a certain degree of bending or movement forward or backward by the USB plug 310.

In some embodiments, the device charging plug 325 may be pivotally coupled to the housing 315. The device charging plug 325 may be moveable between an extended position along a second axis perpendicular to the first axis and a recessed position along the first axis within a channel 320 of the housing 315. The device charging plug 325 may provide power received from a power source via the power plug 305 or the USB plug 310 to a mobile device 105. Examples of a device charging plug 325 may include but are not limited to, a micro A USB plug, a micro B USB plug, a USB Mini A plug, a USB Mini B plug, a standard A USB plug, or a standard B USB plug. IN some embodiments, the device charging plug 325 may be a FireWire plug, an Ethernet plug, a MIDI plug, an eSATA or eSATAp connector, a Thunderbolt connector, or a Lightning connector.

The device charging plug 325 may be rotatably coupled to the housing 315, wherein the device charging plug 325 may be rotated around an axis to be better positioned to plug into a mobile device 105 for charging.

In FIG. 3B, a perspective view 350 of a power adapter 110 is depicted. Specifically, FIG. 3B depicts that the device charging plug 325 may be interchangeable. The device charging plug 325 may be removed from the power adapter 110 and replaced by a different kind of device charging plug (e.g., changing from a micro USB charger to a mini USB charger). The device charging plug 325 may be connected to the power adapter through a port 330 to transmit power received from a power source via the power plug 305 or the USB plug 310 to the mobile device 105 via the device charging plug 325. Some embodiments may use similar mechanisms to change power plugs 305 or USB plugs 310 on the power adapter 110.

Now referring to FIG. 4, which schematically depicts a side view of power adapter 110 for mobile devices 105 in accordance with one or more embodiments of the disclosure. In some embodiments, the power plug 305 and the USB plug 310 may extend from the housing 315 of the power adapter 110 along the same first axis (e.g., X-axis) but in opposite directions. The device charging plug 325 may be pivotally coupled to the housing 315 of the power adapter 315. When in the extended position, the device charging plug 325 may extend out from the housing 315 along a second axis (e.g., Y-axis). The device charging plug 325 may be connected to the housing 315 of the power adapter 110 by an elastic or flexible material 405, such as a rubber or plastic material, that may allow the device charging plug 325 to flex by at least a few degrees in a forward or backward slant, thereby allowing the device charging plug 325 to accommodate a position of a mobile device 105 plugged into the device charging plug 325 and leaning forward or backward. In some embodiments, the device charging plug 325 may also be rotationally coupled to the housing 315 of the power adapter 110, where the device charging plug 325 may be rotated around the second axis (e.g., Y-axis) to better position the device charging plug 325 to be plugged into a mobile device 105. When the device charging plug 325 is positioned within the channel 320 of the housing 315 in the recessed position, the plugs protruding from the housing 315 of the power adapter 110 are within the same plane (e.g., along the X-axis), thereby producing a small profile for the power adapter 110. The small profile may reduce the likelihood of plugs extending out perpendicularly to power plug 305 and the USB plug 310 from snapping off or otherwise being damaged while in a pocket or purse.

Now referring to FIG. 5, which schematically depicts a side view of a configuration of a power adapter 110 for mobile devices, such as 105, in accordance with one or more embodiments of the disclosure. In some instances, the prongs of the power plug 305 may be pivotally coupled to the housing of the power adapter 110. The prongs of the power plug 305 may be positioned in a recessed position within a channel of the housing 315 of the power adapter 110. In the extended position, the prongs of the power plug 305 may extend from the housing along a first axis, whereas the prongs of the power plug 305 may be positioned along a second axis perpendicular to the first axis in the recessed position. The device charging plug 325 may be positioned on a side perpendicular to the power plug 305 in its extended position along the first axis (e.g., the device charging plug is positioned along the second axis) and may be connected to the housing of the power adapter 110 by an elastic or flexible material 405 or by a flexible mechanical joint, such as a hinge. In some embodiments, the USB plug 310 may be positioned on an opposite end of the power adapter 110, extending from the housing 315 along the second axis, in parallel to the device charging plug 325. When the power plug 305 is in its recessed position, the other plugs coupled to the power adapter 110 extend out from the housing 315 of the power adapter 110 in the same plane, thereby producing a small profile (e.g., no plugs extending in a perpendicular plane).

Illustrative Methods

Figure 6:
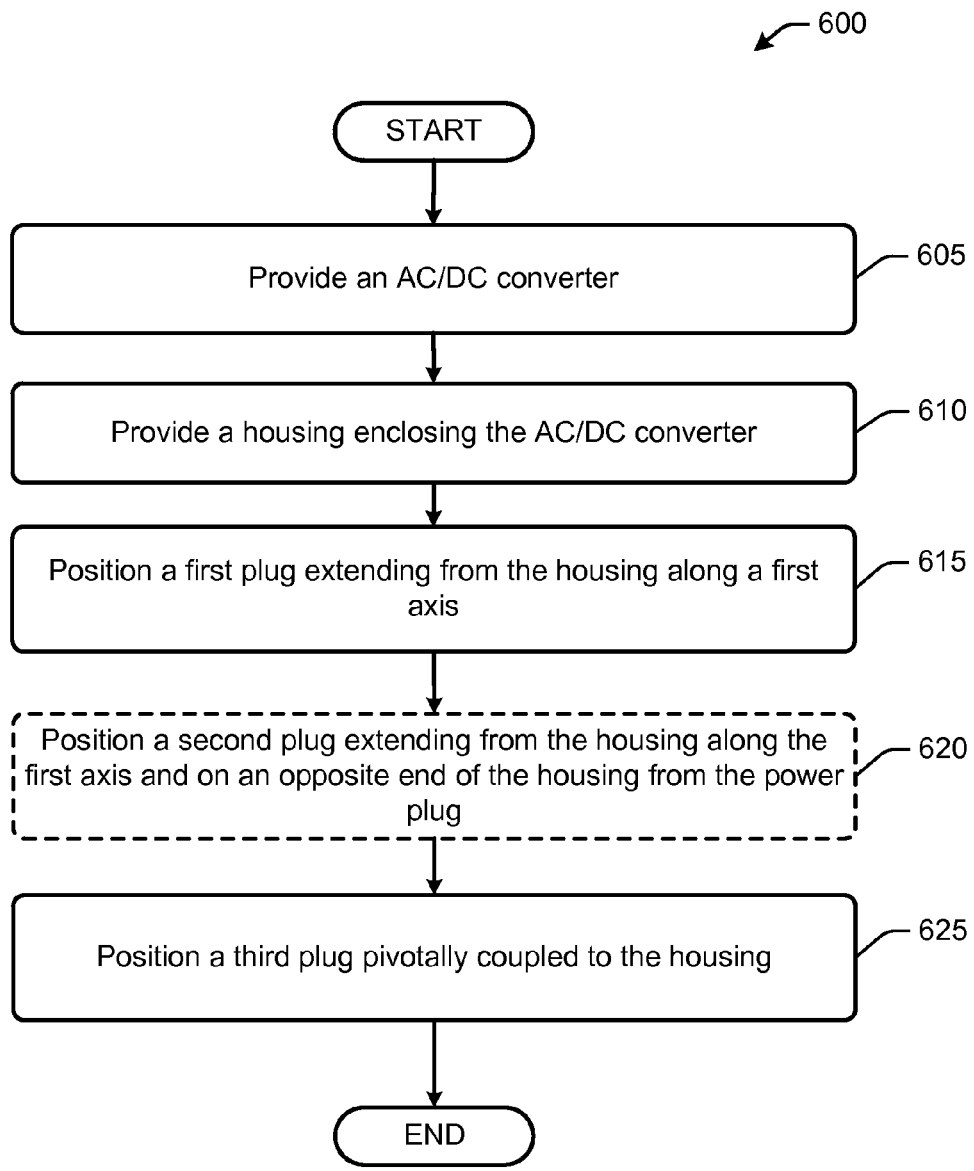
FIG. 6 is a flow diagram depicting an illustrative method for providing a power adapter for mobile devices in accordance with one or more embodiments of the disclosure.

FIG. 6 is a flow diagram depicting an illustrative method 600 for providing a power adapter 110 for mobile devices 105 in accordance with one or more embodiments of the disclosure.

At block 605 of method 600, an AC/DC converter may be provided. In some embodiments, the AC/DC converter may covert electrical power from a power source from an initial voltage-current level to a second voltage-current level. For example, the AC/DC converter may convert alternating current (AC) power to direct current (DC) power to charge a mobile device 105.

At block 610, a housing 315 enclosing the AC/DC converter may be provided. The housing may be configured to enclose internal components of the power adapter 110, such as the AC/DC converter and a processor. The housing may be made of or fashioned out of a protective hard material, such as a plastic, acrylic, metal, or the like.

At block 615, a first plug may be positioned, extending from the housing 315 along a first axis. The first plug may be a USB plug 310, power plug 305 or a device charging plug 325. The power plug 305 may be any type of AC power plug that may be connected to a primary AC power supply through an AC socket. For example, in North America, the power plug 305 may be a NEMA 1-15 power plug, whereas in some parts of Europe, the power plug 305 may be a Schuko plug. In some embodiments, the first plug may be in a fixed position on the surface of the housing 315 of a side of the power adapter 110. In some embodiments, the first plug may be pivotally coupled to the housing, where in the first plug may extend from the housing 315 along a first axis. In the recessed position, the first plug may be positioned into a channel of the housing 315. In some embodiments, the first plug may be retracted into the housing 315 of the power adapter 110. In some embodiments, the recessed position of the first plug may be along the first axis or the second axis.

At block 620, the second plug, which may be the power plug 305 or the USB plug 310, may be positioned, extending from the housing 315 along the first axis and on an opposite end of the housing 315 from the first plug. In some embodiments, block 620 may be optional. In some embodiments, the second plug may be positioned on a side of the power adapter 315 that is perpendicular to the position of the first plug. In some embodiment, the second plug may be slidable and/or retracted into the housing 315 of the power adapter 110.

At block 625, a third plug, which may be device charging plug 325 or a power plug 305 and is not the first plug, may be positioned on a surface of the power adapter 110 perpendicular to the first plug and/or perpendicular to the second plug. The third plug may be pivotally coupled to the housing 315 of the power adapter 110. In some embodiments, the housing 315 may have a channel 320 for the third plug to be positioned within in the recessed position. When in the extended position, the third plug may be positioned along the second axis which is perpendicular to the first access. The third plug may be positioned on a side of the power adapter 110 that is perpendicular to the first plug when the first plug is in its extended position.

In some embodiments, the third plug may also be rotationally coupled to the housing 315 of the power adapter. For example, the third plug may be rotated around the second axis when in the extended position to allow a user to rotate the device charging plug 325 into a better position to attach the mobile device 105 to be charged.

Figure 7:
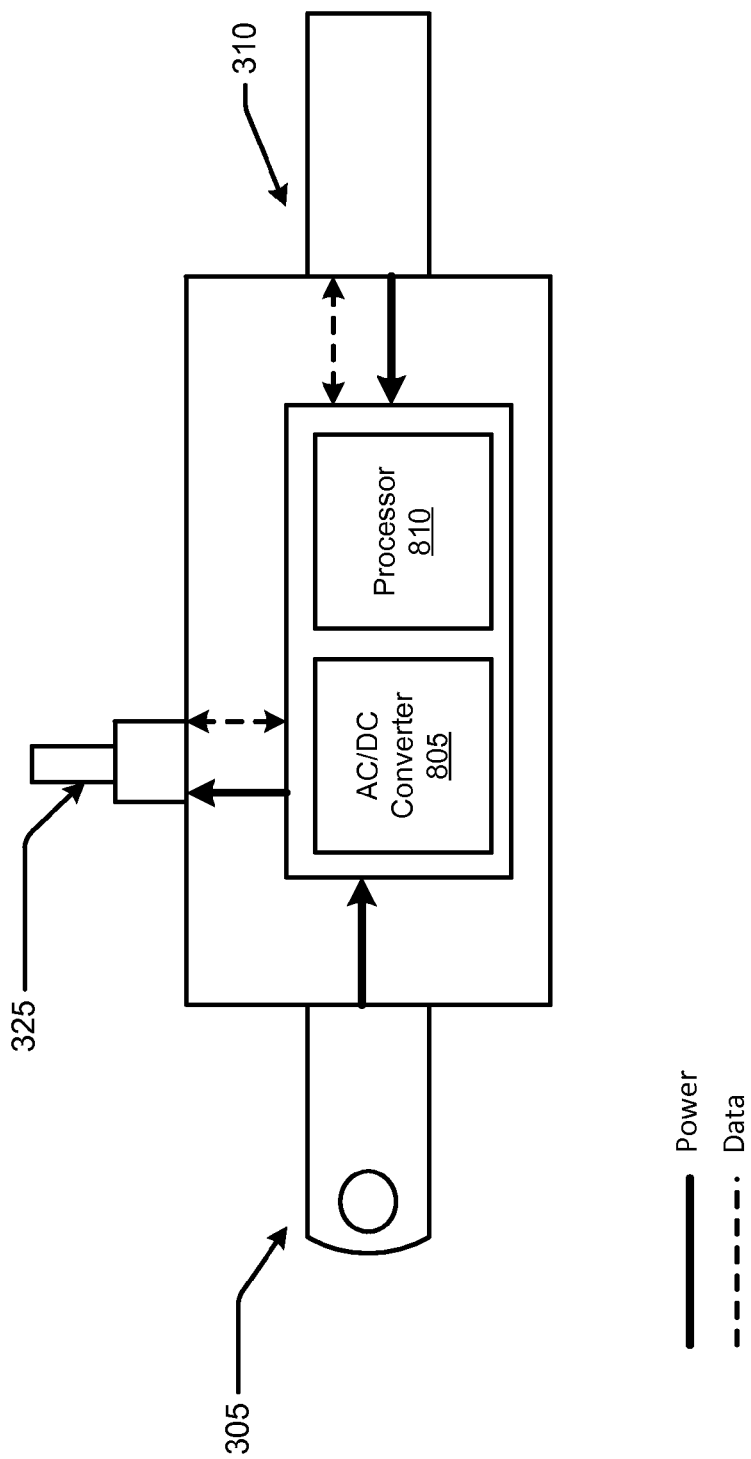
FIG. 7 schematically depicts a side view of a circuit diagram and power flow of a power adapter for mobile devices in accordance with one or more embodiments of the disclosure.

FIG. 7 schematically depicts a side view of a circuit diagram of a power adapter for mobile devices in accordance with one or more embodiments of the disclosure. The flow of power is depicted by the solid arrows and the flow of data is depicted by the dashed arrows. The power adapter 110 for mobile devices 105 may include an AC/DC converter 805 that may convert alternating current to direct current which may be used to power or charge a mobile device 105. The power adapter 110 may also include a processor 810 that may be able to detect power charging information associated with a mobile device 110, such as a voltage associated with charging the mobile device 110, or detecting when a mobile device 110 is fully charged and stopping the power flow from the power plug 305 or the USB plug 310 to the device charging plug 325. In some embodiments, the processor 810 may be able to facilitate data flow between the device charging plug 325 and the USB plug 310 to enable data transfer between devices or data synchronization between devices. As depicted in FIG. 7, power may flow from the power plug 305 to the AC/DC converter 805. The AC/DC converter 805 may convert the AC power from the power plug 305 to DC power to be supplied to the device charging plug 325. In some embodiments, the AC/DC converter 805 may convert the AC power from the power plug 305 to DC power to be supplied to the USB plug 310. In some embodiments, power may flow from the USB plug 310 through the AC/DC converter 805 to the device charging plug 325.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described (e.g., manipulating a magnetic field, magnetic polarizations, etc.), embodiments of the disclosure may relate to numerous other device characteristics. Further, while embodiments of the disclosure have been described with respect to specific power adapter and plug configurations and positions, numerous other power adapter and plug configurations and positions are within the scope of this disclosure. Still further, while embodiments of the disclosure have been described with respect to specific types or configurations of power adapters and plugs, numerous other types and configurations of power adapters and plugs are within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

That which is claimed is:

1. A power adapter apparatus for creating an electrical connection between a power source and a mobile device, the apparatus comprising:
   an alternating current to direct current (AC/DC) converter, wherein the AC/DC converter converts electric power from a power source;
   a housing enclosing the AC/DC converter;
   a device charging plug coupled to a first surface of the housing; and
   a power plug coupled to a second surface of the housing,
      wherein the power plug is a first plug extending from the housing along a first axis,
      wherein the device charging plug is a second plug moveable between an extended position along a second axis perpendicular to the first axis and a recessed position along the first axis within a channel of the housing, and wherein the device charging plug is rotationally coupled to the housing,
      wherein the device charging plug is configured to be coupled to a charging port associated with a mobile device to provide power to the battery of the mobile device from the power source connected to the power adapter, and
      wherein the power adapter apparatus is maintained in a first elevated position above an external surface when the power plug is coupled to the power source and the second surface is adapted to at least partially support the mobile device in a second elevated position above the external surface when the charging port of the mobile device is coupled to the device charging plug and the power adapter apparatus is in the first elevated position, and a Universal Serial Bus (USB) plug extending from the housing along the first axis and on an opposite end of the housing from the first plug.

2. The power adapter apparatus of claim 1, wherein the power source is one of a power supply connected to the power adapter by the power plug.

3. The power adapter apparatus of claim 1, wherein the device charging plug is one of a micro A USB plug, a micro B USB plug, a USB Mini A plug, a USB Mini B plug, a standard A USB plug, or a standard B USB plug.

4. A power adapter, comprising:
   an alternating current to direct current (AC/DC) converter, wherein the AC/DC converter converts electric power from a power source;
   a housing enclosing the AC/DC converter;
   a power plug coupled to a first surface of the housing; and
   a device charging plug coupled to a second surface of the housing, wherein the power plug is a first plug extending from the housing along a first axis and wherein one of the device charging plug is a second plug moveable between a first position along a second axis perpendicular to the first axis and a second position along the first axis within a channel of the housing and wherein the device charging plug is rotationally coupled to the housing, and
   wherein the power adapter is maintained in a first elevated position above an external surface when the power plug is coupled to the power source and the second surface is adapted to at least partially support a mobile device in a second elevated position above the external surface when the mobile device is coupled to the device charging plug and when the power adapter is in the first elevated position, and a Universal Serial Bus (USB) plug extending from the housing along the first axis and on an opposite end of the housing from the first plug.

5. The power adapter of claim 4, wherein at least one of the device charging plug, USB plug, or the power plug is coupled to the housing by a flexible mechanism.

6. The power adapter of claim 4, wherein at least one of the power plug, the device charging plug, or the USB plug is retractable into the housing.

7. The power adapter of claim 4, wherein at least one of the power plug, device charging plug, or USB plug is rotationally coupled to the housing.

8. The power adapter of claim 4, wherein the USB plug is a dedicated charging port without data support.

9. The power adapter of claim 4, wherein at least one of the power plug, USB plug, or the device charging plug is interchangeable with a different plug.

10. The power adapter of claim 4, wherein the power source is one of a power supply connected to the power adapter by the power plug.

11. The power adapter of claim 4, wherein the power plug comprises alternating current (AC) prongs.

12. The power adapter of claim 4, wherein the device charging plug is one of a micro A USB plug, a micro B USB plug, a USB Mini A plug, a USB Mini B plug, a standard A USB plug, or a standard B USB plug.

13. The power adapter of claim 4, wherein the device charging plug is the second plug, and wherein the device charging plug is rotatable about the second axis.

14. A method, comprising:
   providing an alternating current to direct current (AC/DC) converter, wherein the AC/DC converter converts electric power from a power source;
   providing a housing enclosing the AC/DC converter;
   positioning a first plug extending from a first surface of the housing along a first axis; and
   positioning a second plug pivotally coupled to a second surface of the housing,
      wherein the first plug is a power plug,
      wherein the second plug is a device charging plug being moveable between an extended position along a second axis perpendicular to the first axis and a recessed position along the first axis and wherein the device charging plug is rotationally coupled to the housing, and wherein the power adapter is maintained in a first elevated position above an external surface when the power plug is coupled to the power source and the second surface is adapted to at least partially support a mobile device in a second elevated position above the external surface when the mobile device is coupled to the device charging plug and when the power adapter is in the first elevated position, and positioning a Universal Serial Bus (USB) plug extending from the housing along the first axis and on an opposite end of the first plug.

15. The method of claim 14, further comprising:
providing a channel in the housing, wherein the second plug in the recessed position is positioned within a channel of the housing.

16. The method of claim 14, further comprising:
attaching at least one of the first plug or the second plug to the housing by a flexible mechanism, wherein the flexible mechanism is one of an elastic material or a hinge.

17. The method of claim 14, wherein the USB plug is a dedicated charging port without data support.

18. The method of claim 14, wherein the device charging plug is one of a micro A USB plug, a micro B USB plug, a USB Mini A plug, a USB Mini B plug, a standard A USB plug, or a standard B USB plug.

* * * * *